Aug. 5, 1952         W. B. SMITH         2,605,600
COTTON HARVESTER SPINDLE CONSTRUCTION
Filed June 13, 1949
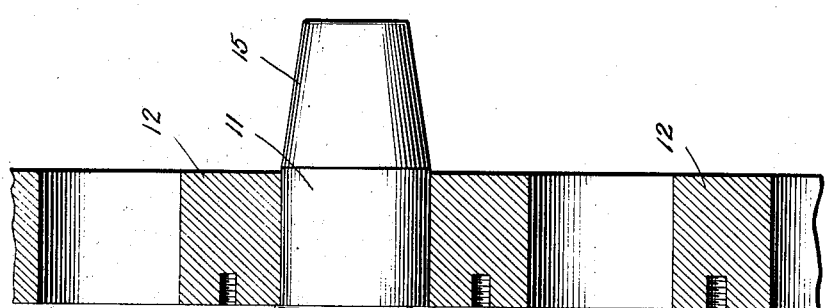
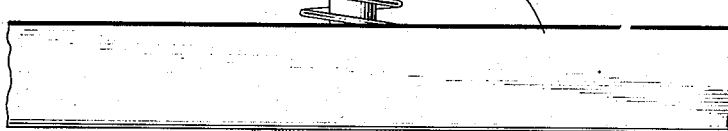
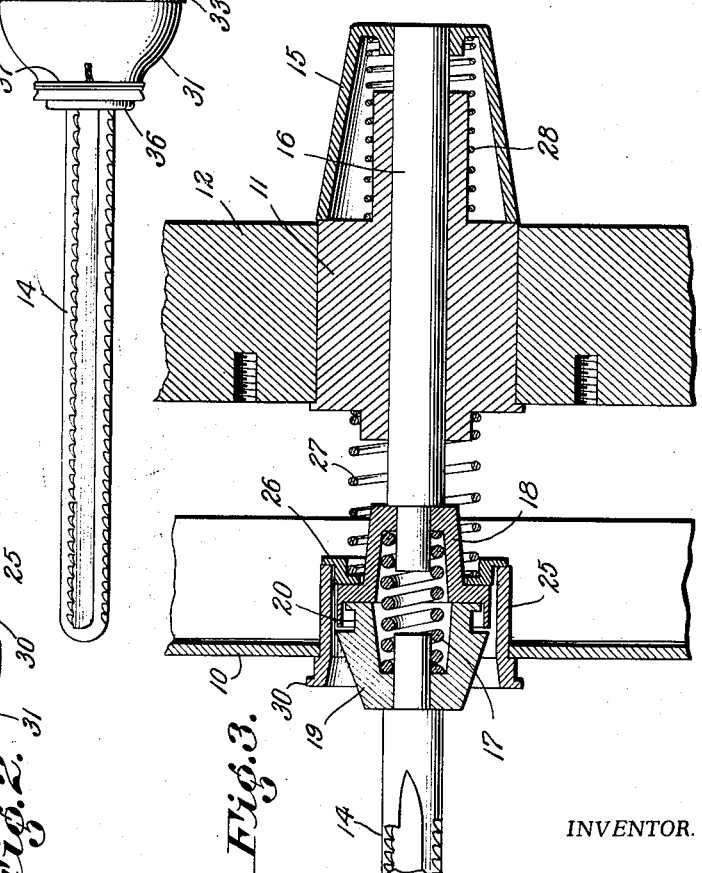
INVENTOR.
William Burris Smith
By
ATTORNEY Patented Aug. 5, 1952

2,605,600

UNITED STATES PATENT OFFICE 2,605,600

COTTON HARVESTER SPINDLE CONSTRUCTION

William B. Smith, Greenville, Miss., assignor of one-half to Hugh A. Gamble, Greenville, Miss.

Application June 13, 1949, Serial No. 98,839

6 Claims. (Cl. 56—50)

This invention relates to cotton harvesters and more particularly to improvements in rotary type cotton picking spindles and stripper bar bearings for the spindles.

The spindle type cotton picker as shown, for example, in Patent 1,747,566 issued to Hiram N. Berry, February 18, 1930, comprises a plurality of rotary picking spindles supported by and projecting from a rotary drum or cylinder. The drum is rotated on a vertical axis and moved along the side of a row of cotton plants while the rotary picking spindles are successively projected into the plants to wind off the cotton fibers. The picked cotton on the spindles is removed therefrom after the spindles are withdrawn from the cotton plants by vertically arranged laterally movable stripper bars through which the spindles project.

The projecting picking spindles previously used have been subjected to damage by being bent or broken by engagement with large stalks or branches of cotton plants. It has been proposed to provide cotton picking spindles with a non-rotary support having a flexible portion, as shown for example in Patent 382,535 issued to William L. Langley, May 8, 1888, to permit the spindle to yield or bend laterally in all directions. It has also been proposed to provide stripper bars with loose bearings for non-flexible spindles as shown in Patent 1,909,646 issued to Louis E. Wirth, May 16, 1933. Such prior flexible spindles and loose spindle bearings are not suitable for use in picking machines of the flexible rotary spindle type.

It is an object of this invention to provide an improved flexible cotton picking rotary spindle for use in stripper bar type cotton pickers.

It is another object of this invention to provide a stripper bar having an improved guard seal and bearing for a flexible rotary picking spindle.

It is a further object of this invention to provide a stripper bar having resiliently supported stabilizing bearings for flexible rotary picking spindles.

It is a still further object of this invention to provide a stripper bar having rubber guards for resiliently mounting and protecting such spindle bearings.

Other objects and advantages of this invention will be readily apparent to those skilled in the art from examination of the following description of the preferred embodiment illustrated in the accompanying drawings wherein:

Figure 1 is an elevational view of a rotary type cotton picking spindle assembly supported by a drum, a portion of which is shown in section, projecting through a portion of a vertical stripper bar.

Figure 2 is a vertical sectional view with parts separated of the stripper bar, spindle bearing and guard shown in Figure 1.

Figure 3 is a horizontal sectional view of the picking spindle assembly and flexible driving connection shown in Figure 1.

Referring to the drawings, the stripper bar 10 may be a channel-shaped bar arranged to be moved laterally on cam tracks or the like as shown in the Berry patent mentioned above. Cotton picking spindle assemblies supported in bearings 11 secured in a rotary drum 12 project through openings 13 in the stripper bar 10, the outer portion 14 of the spindle assembly being provided with conventional grooves and/or notches and the inner portion of the assembly being provided with a driving cone 15 for rotating the outer portion 14 during the cotton picking operation.

For the sake of simplicity, only one picking spindle assembly and a portion of one stripper bar are illustrated in the drawings. A complete cotton harvester unit may include thirty-six vertical rows of eighteen spindles each carried by a cylindrical drum, making a total of six hundred and forty-eight spindles per unit. The spindles in each vertical row are spaced apart a distance somewhat less than the normal diameter of a boll of cotton, so that when the spindles enter a cotton plant each boll of cotton will be engaged by at least one of the spindles, as is well known by those skilled in the art.

Each spindle assembly comprises a drive portion 16 connected to the picking portion 14 by a coil spring 17. The spring 17 is rigidly secured to the outer end of drive portion 16 and to the inner end of the picking portion 14. The drive portion 16 rotates in the bearing member 11 and is adapted to slide axially with respect thereto. The driving cone 15 is rigidly secured to the inner end of drive portion 16 and is adapted to make contact with frictional driving rings, not shown, within the drum 12. The driving spring 17 is enclosed by overlapping sleeves 18 and 19, sleeve 18 being secured to member 16 and sleeve 19 being secured to the picking member 14. The rearward periphery of sleeve 19 may have an annular groove 20 therein opposite the forward edge of sleeve 18 to permit picking member 14 and sleeve 19 to flex with respect to the longitudinal axis of member 16. The connecting spring 17 and sleeves 18 and 19 are normally positioned within a bushing 25 which latter fits snugly into the opening 13 in the stripper bar 10. A washer 26 surrounds a portion of the sleeve 18 and is urged against the inner edge of bushing 25 by the compression spring 27. The other end of the spring 27 engages the bearing member 11. A second compression spring 28 extends between the bearing member 11 and the driving cone 15. The spring 27 is heavier and stronger than the spring 28 and normally tends to maintain spring 28 compressed with the cone 15 close to the bearing member 11. When the stripper bar 10 and bushing 25 carried thereby is shifted laterally toward the surface of the drum 12, washer 26 compresses spring 27 thereby permitting spring 28 to press the driving cone 15 into resilient engagement with frictional driving discs.

The bushing 25 is provided with a double shoulder at its outer end to provide an annular flange 30 to which the rubber guard 31 is secured. The guard 31 has an inward flange 32 to seat behind the flange 30 and a compression band 33 may be applied to hold the said flanges interlocked. The forward end of the rubber guard 31 is also provided with an inward flange 34 to engage an annular groove 35 in the stabilizing bearing sleeve 36. The bearing sleeve 36 may be formed of hard plastic or other suitable bearing material and the inner bore of the sleeve 36 engages the surface of picking spindle 14 to stabilize the rotation of the spindle. A wire or compression band 37 may be positioned around the forward end of guard 31 to lock the flange 34 in the groove 35 of the stabilizing bearing 36.

During the cotton picking operation of a harvester unit having spindle assemblies such as described above, the resiliently mounted bearing sleeve 36 serves to urge the picking portion 14 to rotate on the same axis of rotation as the driving portion 16. When the picking portion 14 engages a large stalk of the cotton plant which might tend to bend the outer portion 14 of the spindle, the spring 17 connecting portion 14 to drive portion 16 permits portion 14 to be deflected out of normal alignment with portion 16, without bending or breaking the spindle, so that the portion 14 may pass the stalk without being damaged and without damaging the stalk. The stabilizing bearing sleeve 36 permits the portion 14 to continue to be rotated without any whipping motion. When the stripper bar 10 is moved laterally away from the spindle supporting drum 12 to strip picked cotton from the spindle portion 14, the bearing 36 and the resilient guard 31 serve to strip cotton from the picking portion 14 of the spindle. The provision of the resilient guard prevents picked cotton from reaching the spindle sleeves 19 and 18, and from engaging and becoming entangled with spring drive 17 contained therein.

This invention contemplates the use of equivalent forms of bearings, guards, resilient drives, and the like, as it will be readily apparent to those skilled in the art that many such variations are possible within the scope of the following claims.

I claim:

1. In a cotton harvester movable along a row of cotton plants and having a picking unit including rows of rotatable picking spindles supported for movement into and out of said cotton plants, the combination comprising: a stripper bar for each row of picking spindles; a rotary spindle assembly projecting through said stripper bar; said assembly including a driving portion, a picking portion, and a coil spring connecting said portions; a bearing for said picking portion; and a resilient support for said bearing secured to said stripper bar.

2. In a cotton harvester movable along a row of cotton plants and having a picking unit including rows of rotatable picking spindles supported for movement into and out of said cotton plants, the combination comprising: a stripper bar for each row of picking spindles; a rotary spindle assembly projecting through said stripper bar; said assembly including a driving portion, a picking portion, and a flexible member connecting said portions; a flexible guard secured to and projecting forward from said stripper bar about the inner end of said picking portion; and a stabilizing bearing for said picking portion carried by the forward end of said flexible guard.

3. In a rotary spindle assembly for a cotton harvester, the combination comprising, a driving portion, a cotton picking portion, a coil spring connecting said portions, a guard sleeve secured to said driving portion and extending over a portion of said coil spring, and a second guard sleeve secured to said picking portion and extending over a portion of said coil spring, said sleeves having overlapping portions guarding against the entry of cotton to said coil spring.

4. In the rotary spindle assembly defined in claim 3, said second guard sleeve having an annular recess therein opposite the forward edge of said first guard sleeve, whereby the said sleeves allow deflection of the picking portion of said spindle assembly with respect to said driving portion of said spindle.

5. In a cotton harvester having a picking unit including rows of rotatable picking spindles and a stripper bar for each row of spindles, the combination comprising a sleeve mounted in said stripper bar around each spindle, a projecting shoulder on the outer end of each sleeve, a rubber guard member having one end engaging and secured to the shoulder of said sleeve, and a spindle bearing carried by and secured to the other end of said rubber guard member.

6. In a cotton harvester movable along a row of cotton plants and having a picking unit including rows of picking spindle assemblies supported thereon, each of said spindle assemblies comprising in combination, a rotatable driving portion, a rotatable picking member having a cylindrical portion, a flexible member connecting said picking member with said driving portion, a picking member stabilizing bearing engaging said cylindrical portion of said picking member, and a resilient member connected to said bearing and to said picking unit for resiliently supporting said stabilizing bearing.

WILLIAM B. SMITH.

REFERENCES CITED

The following references are of record in the file of this patent:

UNITED STATES PATENTS

| Number | Name | Date |
|---|---|---|
| 382,535 | Langley | May 8, 1888 |
| 1,636,132 | Hoffnagle | July 19, 1927 |
| 1,747,566 | Berry | Feb. 18, 1930 |
| 1,909,646 | Wirth | May 16, 1933 |
| 2,508,842 | Searles | May 23, 1950 |